United States Patent Office 3,826,641
Patented July 30, 1974

3,826,641
METHOD FOR INCREASING THE SUCROSE CONTENT OF GROWING PLANTS
Clark A. Porter, Kirkwood, Mo., assignor to Monsanto Company, St. Louis, Mo.
No Drawing. Filed Feb. 12, 1973, Ser. No. 331,911
Int. Cl. A01n 9/36
U.S. Cl. 71—86    12 Claims

ABSTRACT OF THE DISCLOSURE

The sucrose content of growing plants is increased by treating the plants, prior to harvest, with 1-hydroxy-1,1-ethanediphosphonic acid or an alkali metal salt thereof.

This invention relates to a method for increasing the sucrose content of growing plants. More particularly, this invention is concerned with a method wherein sugar producing plants are subjected to a chemical treatment which serves to increase the amount of harvestable sucrose in said plants.

1-hydroxy-1,1-ethanediphosphonic acid has long been known for use in water treatment and as a component of detergent formulation. The compound and its salts can be readily prepared by several methods such as those taught in U.S. Pats. 3,366,675, 3,366,676, 3,366,677, 3,449,409 and 3,449,410.

It has now been found that 1-hydroxy-1,1-ethanediphosphonic acid, and the alkali metal salts thereof, when applied to sugar producing plants in the manner hereinafter described, serve to increase the amount of recoverable sucrose in such plants. It is believed that this desirable effect results from an action of the acid or its salts to reduce or retard further vegetative growth of the treated plant. Thus, the reducing sugars which are stored in the plant are not used as energy for plant growth but are rather converted to recoverable sucrose.

In accordance with this invention, 1-hydroxy-1,1-ethanediphosphonic acid and its salts are preferably employed in the treatment of sugarcane and sugar beets since these two plants provide substantially the entire world supply of sucrose. It should be noted, however, that these compounds can also be applied to other plants in which increased sucrose serves to provide additional food for plant growth, improved taste or flavor and other desirable properties. Such other plant species include grapes, melons, citrus and other tree fruit, silage and cereal crops, and root crops.

In the treatment of sugar beets with the acid or salts of this invention, application to the plants should generally be made from about 10 days to 5 weeks prior to the projected date of harvest. Treatment is preferably at a rate in the range of 0.25 to 4.0 pounds per acre, although somewhat higher or lower rates may be employed depending upon the stage of plant maturity, local weather and soil conditions, and other factors understood in the art.

In the case of sugarcane, it is necessary to consider both the chronological age of the plant and its stage of maturity since cane, depending upon the practice in different geographical areas, is grown from 9 to about 30 months before harvest. Application at a rate of from about 0.1 to 5.0 pounds per acre can be made from 2 to 10 weeks prior to the projected harvest date. Preferably, such applications are made from 3 to 7 weeks before said date.

1-hydroxy-1,1-ethanediphosphonic acid and its salts, the active ingredients of this invention, can be conveniently applied to the plants as an aqueous solution or suspension. For example, a liquid composition may be applied from a boom-spray, or a solid dust composition where the active component is diluted with an inert solid such as clay can be blown on the plants from an aircraft. Suitable liquid compositions include surfactants such as those enumerated in U.S. Pats. 3,224,865 and 3,245,775. Preferred surface active agents which are convenient to use in liquid compositions of this invention are of the nonionic type such as alkyl phenoxy poly (ethyleneoxy) ethanols, polyethylene oxide adducts of fatty and resin acids, and long chain alkyl mercaptan adducts with ethylene oxide.

A particularly preferred carrier for the acid or salts of this invention is water with about 0.1 to 2.0% by weight of surfactant added thereto. Alternatively, the aqueous carrier can be replaced by a non-toxic mineral oil as such, or as an oil-in-water or water-in-oil emulsion. It has been found convenient to apply the compositions to the plants in the form of aqueous solutions, suspensions or emulsions, the dilution being such that a spray volume of from about 7 to 20 gallons of liquid per acre will contain the desired dosage of active ingredient. It will be recognized, however, that higher or lower total spray volumes can be beneficially employed depending upon the particular dispensing apparatus and other factors well understood by those skilled in the art.

The specific examples which follow are presented as illustrative, non-limiting demonstrations of the useful and unexpected properties of the acid and salts of this invention.

EXAMPLE I 0.5 grams of 1-hydroxy-1,1-ethanediphosphonic acid (in the monohydrate form) is dissolved in 4 ml. water that contains as a surfactant about 0.25% (w./w.) nonylphenol which was ethoxylated to contain about 10.5 mols of ethylene oxide per mol. of nonylphenol ("Tergitol NPX"). 0.6 ml. of this solution is deposited or dropped by means of a syringe with a fine needle on the spindle area at the top or last visible dewlap of each of 20 stalks of sugarcane aged 16.1 months. (A dewlap is the junction between the blade of the leaf and the sheath which clasps the stalk.) Ten of these stalks were harvested 4 weeks after such treatment and 10 more were harvested 5 weeks after such treatment.

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarmetric determination and equals the percentage of sucrose if the latter is the only substance in the solution which will rotate the plane of polarized light. In any event, determination of the pol percent cane is a standard and effective method for determining the sucrose content of sugarcane. The results are given below:

|  | Four weeks | | Five weeks | |
| --- | --- | --- | --- | --- |
|  | Juice purity | Pol percent cane | Juice purity | Pol percent cane |
| Control (untreated) | 77.0 | 8.0 | 80.0 | 9.3 |
| Treated | 88.2 | 12.2 | 84.6 | 11.4 |

These results clearly show a distinct improvement in both sucrose yield and juice purity of the treated plants.

EXAMPLE II

The procedures described in the preceding example are repeated on plants of about 18.2 months of age with the following results:

|  | Four weeks | | Five weeks | |
| --- | --- | --- | --- | --- |
|  | Juice purity | Pol percent cane | Juice purity | Pol percent cane |
| Control (untreated) | 62.67 | 7.61 | 72.07 | 7.97 |
| Treated | 71.25 | 8.07 | 80.73 | 10.90 |

Here again, the treated plants demonstrate a substantial gain in both of the factors measured.

EXAMPLE III

The procedures described in the preceding examples are repeated on plants of about 20.5 months of age with the following results:

|  | Four weeks | | Five weeks | |
| --- | --- | --- | --- | --- |
|  | Juice purity | Pol percent cane | Juice purity | Pol percent cane |
| Control (untreated) | 66.86 | 7.18 | 71.45 | 7.95 |
| Treated | 66.39 | 8.02 | 75.11 | 10.15 |

Although juice purity of the treated plants was approximately the same as that of the control at 4 weeks, all other data shows significant improvements in the treated plants.

Although the invention has been described herein with respect to specific embodiments, the details thereof are not to be construed as limitations except to the extent defined in the following claims.

What is claimed is:

1. A method for increasing the sucrose content of growing plants which comprises applying to said plants, from about 10 days to 10 weeks prior to harvest, an effective amount of 1-hydroxy-1,1-ethanediphosphonic acid or an alkali metal salt thereof.

2. A method as defined in Claim 1 wherein application is at a rate of from about 0.1 to 5.0 pounds per acre.

3. A method as defined in Claim 2 wherein the plants are sugarcane or sugar beets.

4. A method as defined in Claim 2 wherein the plants are sugar beets.

5. A method as defined in Claim 2 wherein the plants are sugarcane.

6. A method as defined in Claim 1 wherein the plants are sugarcane or sugar beets.

7. A method as defined in Claim 6 wherein the plants are sugar beets, and application is made from about 10 days to 5 weeks prior to harvest at a rate of from about 0.25 to 4.0 pounds per acre.

8. A method as defined in Claim 6 wherein the plants are sugarcane, and application is made from about 2 to 10 weeks prior to harvest at a rate of from about 0.1 to 5.0 pounds per acre.

9. A method as defined in Claim 8 wherein said application is made from about 3 to 7 weeks prior to harvest.

10. A method as defined in Claim 1 wherein 1-hydroxy-1,1-ethanediphosphonic acid is applied.

11. A method as defined in Claim 6 wherein 1-hydroxy-1,1-ethanediphosphonic acid is applied.

12. A method as defined in Claim 8 wherein 1-hydroxy-1,1-ethanediphosphonic acid is applied.

References Cited

British Pat. 990,660, Chem. Abst. vol. 63 (1965) 4092f.
Saghir et al.: Chem. Abst., vol. 76 (1972), 95618p.

LEWIS GOTTS, Primary Examiner

C. L. MILLS, Assistant Examiner